Jan. 22, 1952  R. J. COAR  2,583,470
FUEL CONTROL FOR EXHAUST TURBINE POWER PLANTS
HAVING INTERNAL-COMBUSTION GAS GENERATORS
Filed Feb. 6, 1945  6 Sheets-Sheet 1

INVENTOR
RICHARD J. COAR

Charles A. Warren
ATTORNEY

INVENTOR
RICHARD J. COAR
ATTORNEY

Patented Jan. 22, 1952

2,583,470

UNITED STATES PATENT OFFICE 2,583,470

FUEL CONTROL FOR EXHAUST TURBINE POWER PLANTS HAVING INTERNAL-COMBUSTION GAS GENERATORS

Richard J. Coar, Hartford, Conn., assignor to United Aircraft Corporation, East Hartford, Conn., a corporation of Delaware Application February 6, 1945, Serial No. 576,490

6 Claims. (Cl. 60—39.28)

1

The invention relates to fuel controls for power plants of the type in which one or more internal combustion engines provide a supply of gas under pressure which may be additionally heated in a burner for driving a turbine.

In this type of power plant the supply of fuel to the engine or engines and the burner is dependent upon power requirements of the turbine. For example, under normal operating conditions the burner may be off, and all of the fuel used is delivered to and burned in the engines in which case the burner becomes operative only at loads above normal. A feature of this invention is a control for the fuel supply so that the supply of fuel to the power plant may be accurately measured and controlled and also properly divided between the engines and the burner dependent upon the power requirements.

Power plants of this type may be used in aircraft and are, therefore, subject to operation under varying pressure conditions. A feature of the invention is the automatic compensation for changes in the atmospheric pressure which would provide for decreasing the fuel in accordance with decreasing pressures.

The supply of fuel may be controlled by variable orifices with associated controlling mechanisms. In order that such orifices may accurately measure the fuel delivered the pressure drop across the orifices must be controlled. A feature of the invention is an arrangement for maintaining the desired pressure drop across the orifices, thereby assuring accurate measurement of the fuel.

The source of power may be, as above stated, a number of internal combustion engines, each of which may be a combined engine and compressor unit in which the compressor supercharges the engine so that the exhaust gas is delivered at a higher pressure. In the event of failure of one of the units the fuel delivered to the engines is supplied to the remaining units, thereby subjecting these other units to overload conditions, especially when the power plant is operating near full load. A feature of this invention is a pressure relief arrangement by which the degree of overload on the units may be controlled in the event of failure of one or more of the units to operate.

When the power plant is operating at or near full load the failure of one or more of the engine units would result in a sudden and continued loss of power. Another feature of the invention is a load compensating valve which will deliver to the oil burner the fuel not used by the remaining engine units, thereby maintaining substantially the same power.

Other objects and advantages will be apparent from the specification and claims, and from the accompanying drawings which illustrate an embodiment of the invention.

Figure 1:
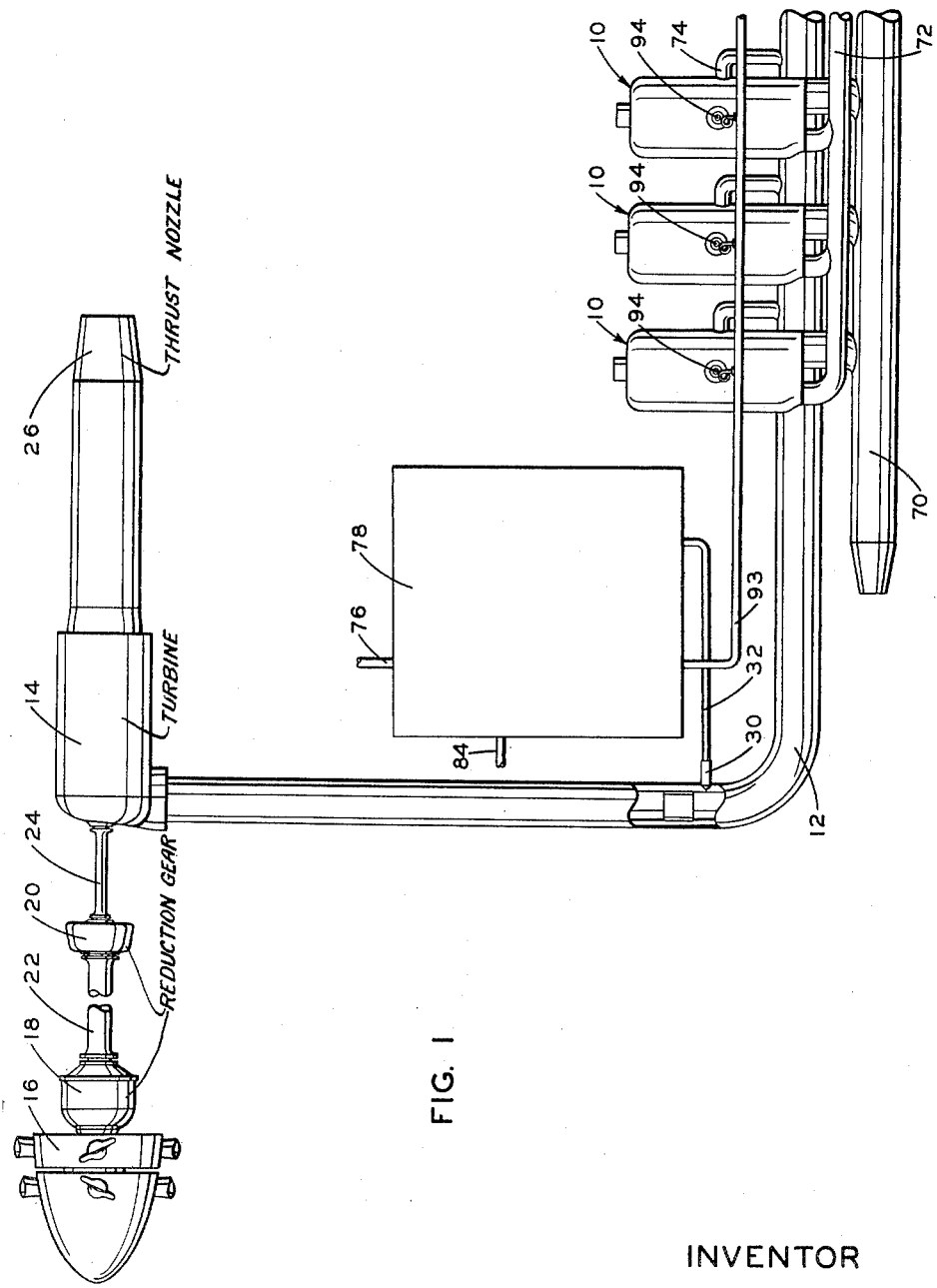
Fig. 1 is a diagrammatic view of a power plant for which the fuel control is adapted.

The generators or engine units 10 supply hot gas under pressure through a duct 12 to the inlet of the turbine 14. The latter is conected by propeller system 16 through gear reduction units 18 and 20 and shafts 22 and 24. The turbine exhaust discharges as a jet through a restricted nozzle 26 which may be directed rearwardly of the aircraft to produce an additional propulsive thrust.

The gas is heated between the generator and the turbine by discharging fuel into duct 12 through a fuel nozzle 30 supplied by a fuel line 32. Fuel is admitted at a point spaced far enough from the turbine to assure complete burning of the fuel before the power gas has reached the turbine inlet.

Figure 2:
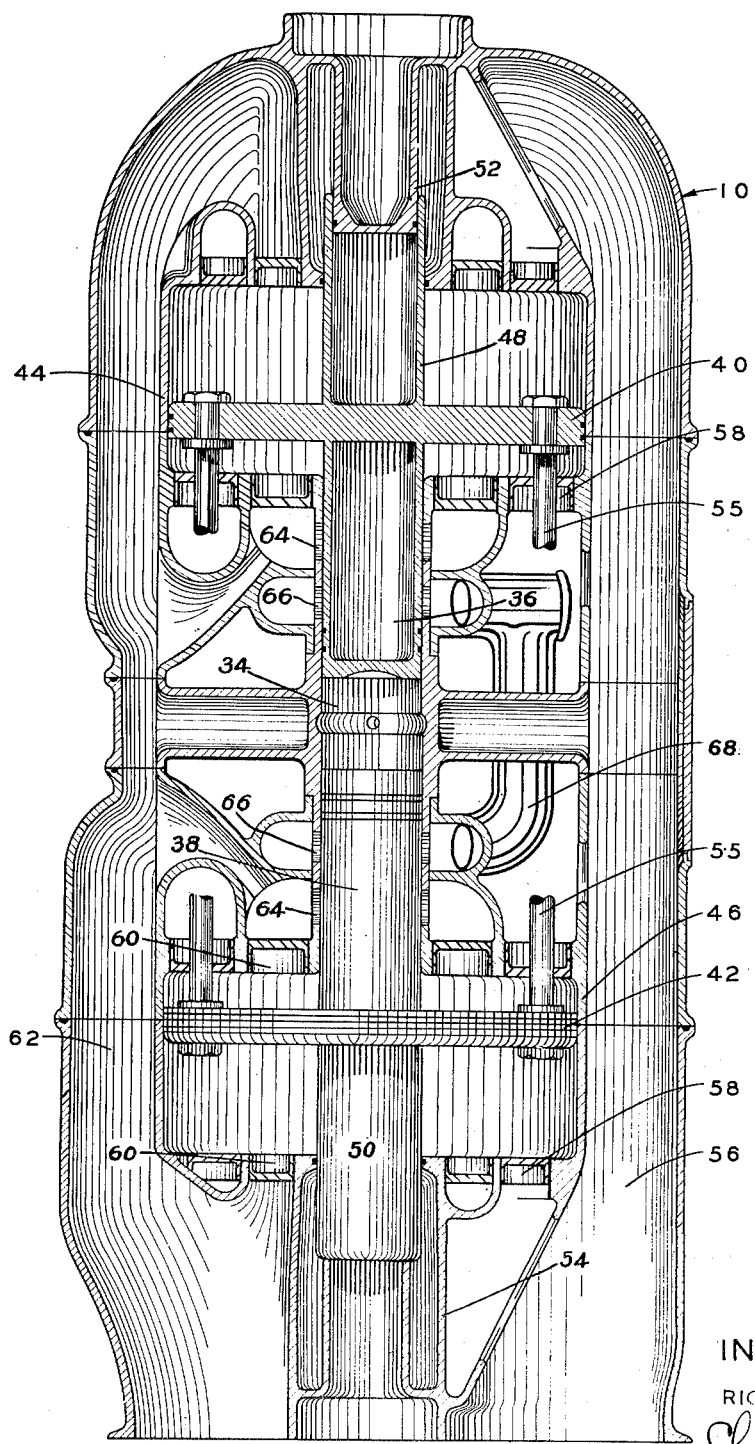
Fig. 2 is a sectional view through one of the engine units.

As shown in Fig. 2 each engine unit is in the form of a free-piston engine and compressor unit comprising an engine cylinder 34 having reciprocating pistons 36 and 38 to which compressor pistons 40 and 42 in cylinders 44 and 46 are integrally connected. Sleeves 48 and 50 attached to the compressor pistons complete the reciprocating piston assemblies. The sleeves in combination with pistons 52 and 54 over which they reciprocate form air spring cylinders.

The piston assemblies are moved apart by the burning of fuel injected into the engine cylinder between the engine pistons. Air compressed in the air spring cylinders on the power stroke returns the piston assemblies. The assemblies are maintained at equal distances from the center of the engine cylinder by a linkage of which rods 55 may form a part.

Intake manifold 56 conducts air to sets of intake valves 58 through which air alternately enters opposite ends of the compressor cylinders. The compressed air reaches the cylinders through sets of discharge valves 60 also at opposite ends of the compressor cylinders and passes through scavenge manifold 62 and through ports 64 which are uncovered by pistons 36 and 38 at the end of the power stroke. Air entering these ports is blown through the engine cylinder and discharges through exhaust ports 66 into exhaust manifolds 68, Figure 2.

The intake manifolds of the several units are connected to an intake duct 70. The scavenge manifolds are interconnected by a pipe 72. The exhaust gases flow from the exhaust manifolds through pipes 74 into duct 12.

Figure 3:
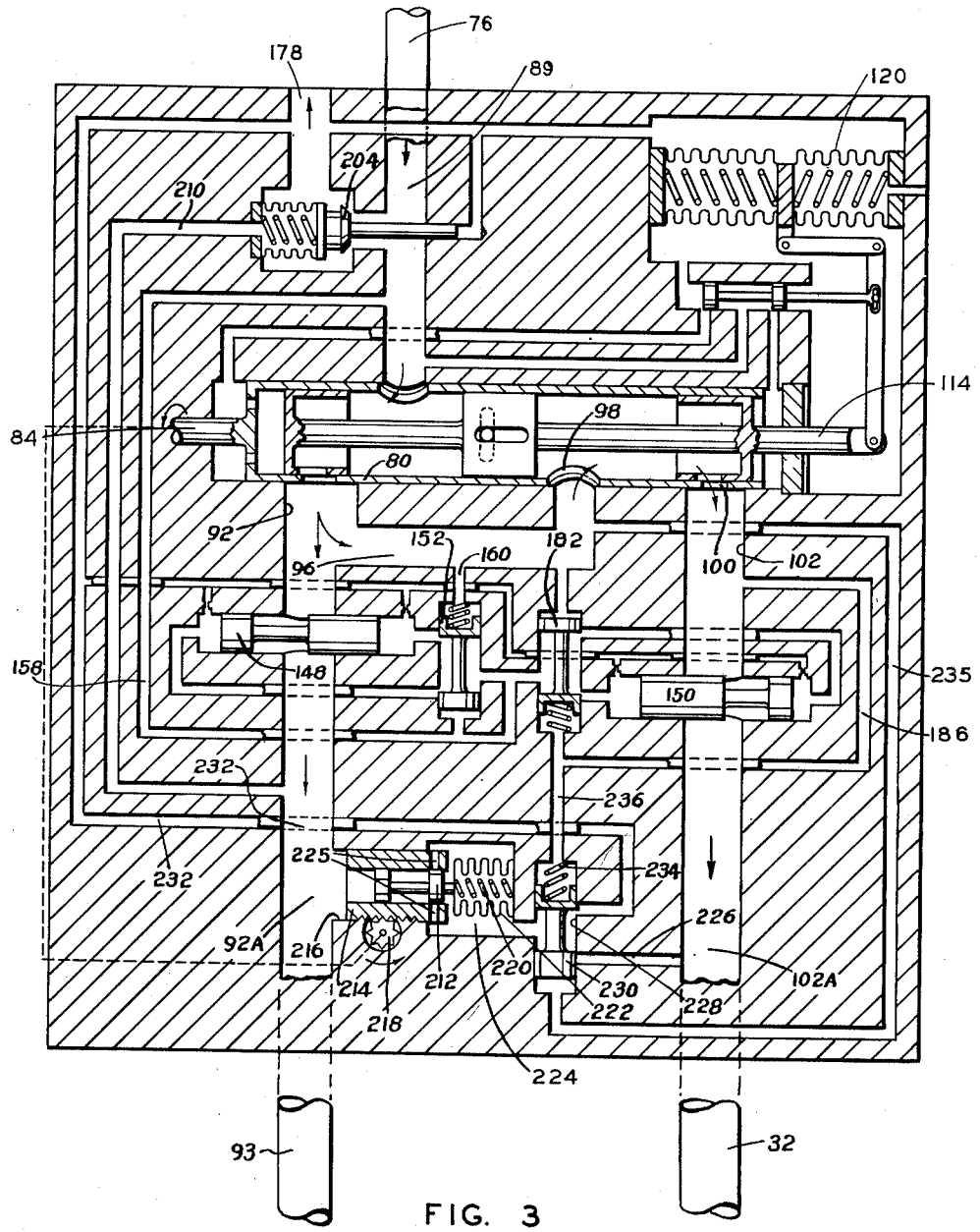
Fig. 3 is a sectional view showing diagrammatically the fuel control.
Figure 4:
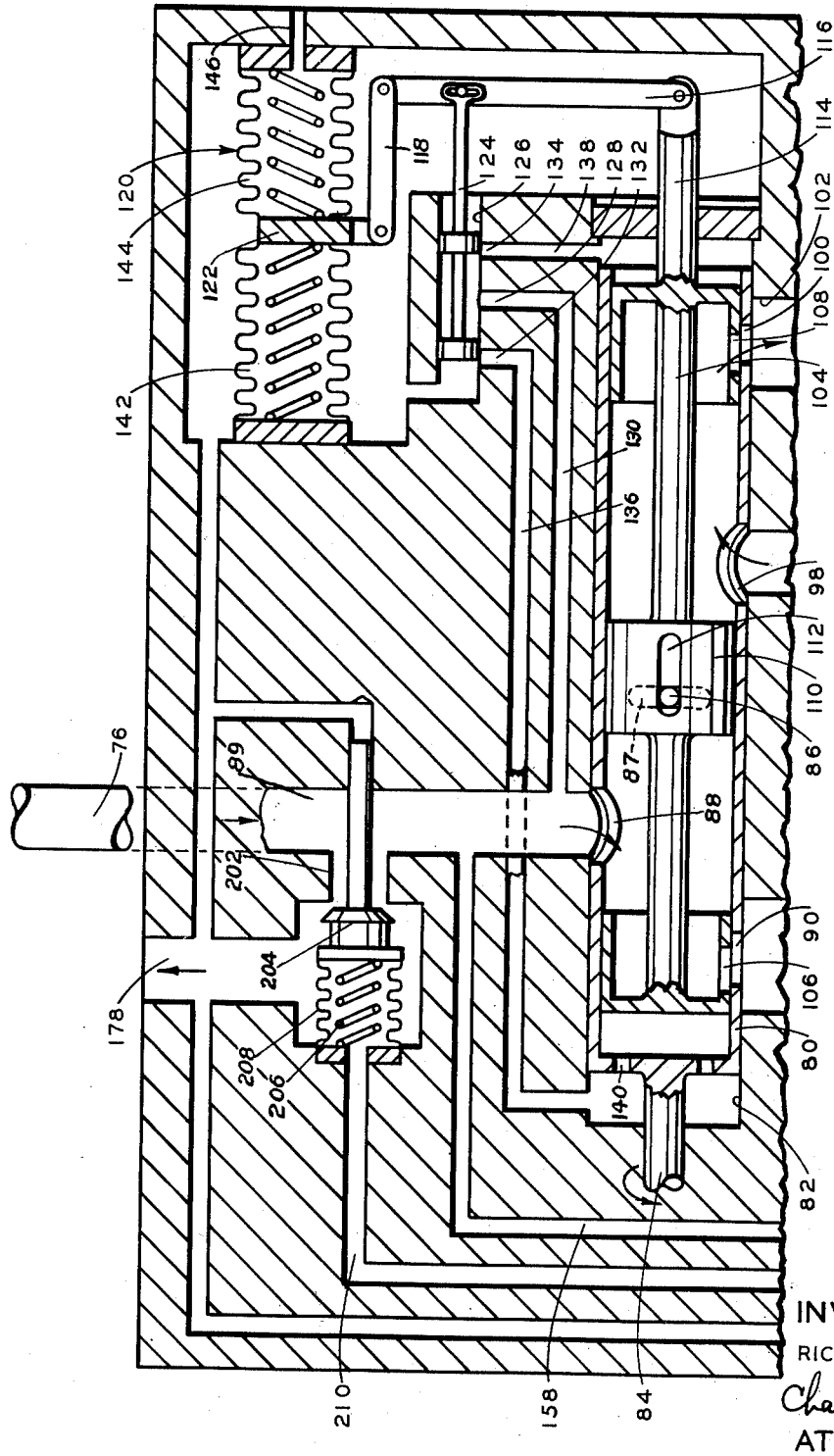
Fig. 4 is a fragmentary view of a part of the fuel control of Fig. 3 showing the fuel control orifices and their associated mechanism.

As shown in Figure 1, fuel under pressure is delivered through a conduit 76 to a fuel control device shown in section in Figs. 3 and 4. This device has a control valve which includes a sleeve 80, Fig. 4, turnable in a cylinder 82 and having a projecting stem 84 by which the sleeve may be turned. A pin 86 engages a circumferential slot 87 in the sleeve to hold the sleeve against axial movement in the cylinder. Sleeve 80 has a port 88 in line with a passage 89 from the conduit 76 through which fuel enters the cylinder 82 and an outlet port 90 through which fuel for the generators and the burner is metered. Fuel flows through channels 92 and 92A and a duct 93 to the injection pumps 94, Figure 1, for the individual generators. Fuel for the burner flows from channel 92 through a channel 96 to a port 98 in sleeve 80. This burner fuel is then metered through an outlet port 100 in sleeve 80 to the passages 102 and 102A which connect with duct 32, Fig. 1, to the nozzle 30.

A spool valve 104 located within sleeve 80 has a port 106 cooperating with port 90 in sleeve 80 for metering the flow of fuel and another port 108 cooperating with port 100 in metering the burner fuel. This spool valve also has a central plug 110 which prevents flow of fuel between port 88 and port 98 in sleeve 80. Pin 86 engages an axial slot 112 in plug 110 to prevent turning of the spool valve although permitting axial movement of the valve.

Ports 90 and 106 cooperate to form a metering orifice for fuel into channel 92 and ports 100 and 108 form a metering orifice for fuel into channel 102. Since sleeve 80 turns without linear movement, and spool valve 104 reciprocates without turning movements the overlapping ports move at right angles to each other. In this way, the fuel flow through the orifice may be made factorially proportional to the motion of each port.

The sleeve valve 80 is adapted to be controlled manually by the pilot for controlling the output of the power plant and is accordingly connected to a main control lever, not shown.

Spool valve 104 provides an altitude control for the fuel flow and acts to decrease the quantity of fuel used in accordance with increase in altitude. This spool valve has a projecting stem 114 connected by a lever 116 and a link 118 to a pressure sensitive bellows 120. As the altitude changes the central member 122 of the bellows to which link 118 is connected moves laterally and operates through a servo-motor to cause the spool valve to move axially.

As shown in Figure 4 the lever 116 has connected to it a valve plunger 124 slidable in a bore 126 having an inlet port 128 connected by a passage 130 connected to fuel inlet passage 89. Bore 126 has outlet ports 132 and 134 connected by conduits 136 and 138 to opposite ends of the cylinder 82 in which the spool valve is slidable. Valve plunger 124 alternately connects inlet port 128 to the outlet ports, and by admitting fuel under pressure to one end or the other of the cylinder 82 causes axial movement of the spool valve 104. It will be noted that one end of sleeve valve 80 is open so that the fuel pressure acts directly on the spool valve 104, and at the other end the sleeve valve has ports 140 so that the fuel under pressure may act directly on this end of the spool valve. By connecting the plunger 124 to link 116 the servo causes spool valve 104 to move an amount proportional to the movement of the central member 122 of the pressure sensitive bellows.

In order to obtain the desired motion for the central member 122 the bellows system includes an evacuated bellows 142 acting on one side of the central member and another bellows 144, the inside of which is open to the atmosphere through a passage 146.

Figure 6:
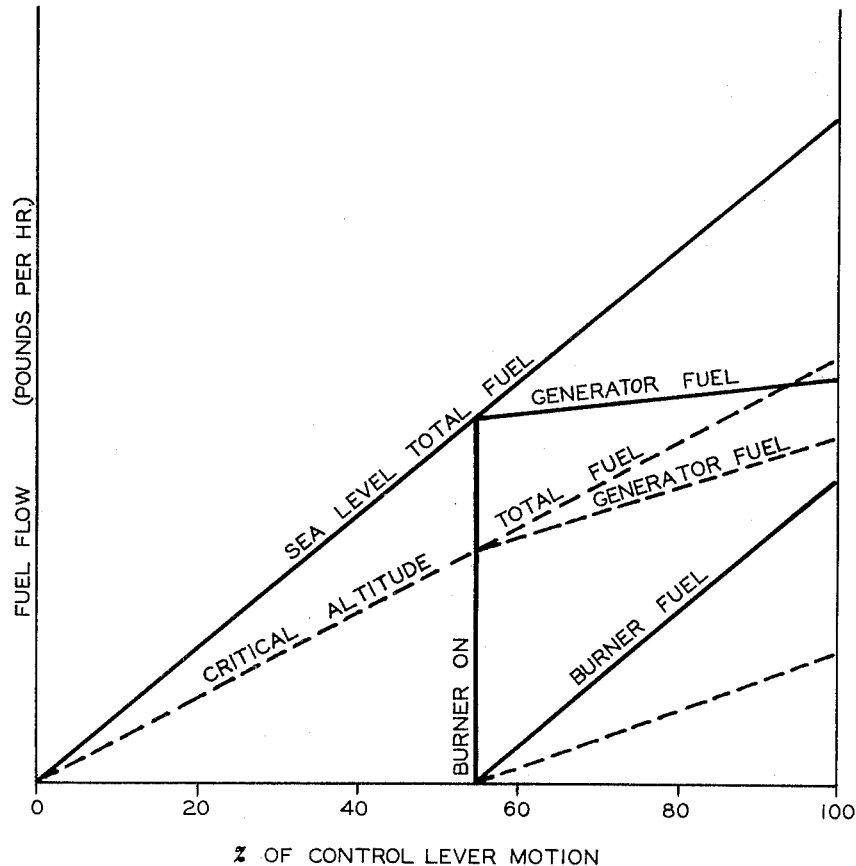
Fig. 6 is a diagram of the fuel flow requirements.

The particular shapes of the outlet ports 90 and 106 which cooperate to meter the total fuel flow through the control valve are selected to obtain the desired flow characteristics. It will be apparent that the flow rate is changed either by turning of sleeve valve 80 or by axial movement of spool valve 104. The same is true of ports 100 and 108 which cooperate to meter the flow of fuel to the burner. In order better to understand the desired operation of the fuel controls the desired results are shown in the graph of Figure 6. As shown, the total fuel flow at sea level is greater than the total fuel at altitude and it is obvious that the fuel flow will vary between the two total fuel flow lines on the chart depending upon the altitude at which the power plant is operating. The burner begins to operate only at a predetermined setting of the main control lever at which point ports 100 and 108 move into alignment to permit flow of fuel to the burner. The arrangement is such that the burner fuel is taken away from the total fuel as metered by ports 90 and 106 so that the remaining fuel is delivered to the generators. Thus for all loads on the power plant, the ports 90 and 106 cooperate to meter the total fuel flow to both burner and generators, and the ports 100 and 108 cooperate to meter the fuel to the burner.

Figure 5:
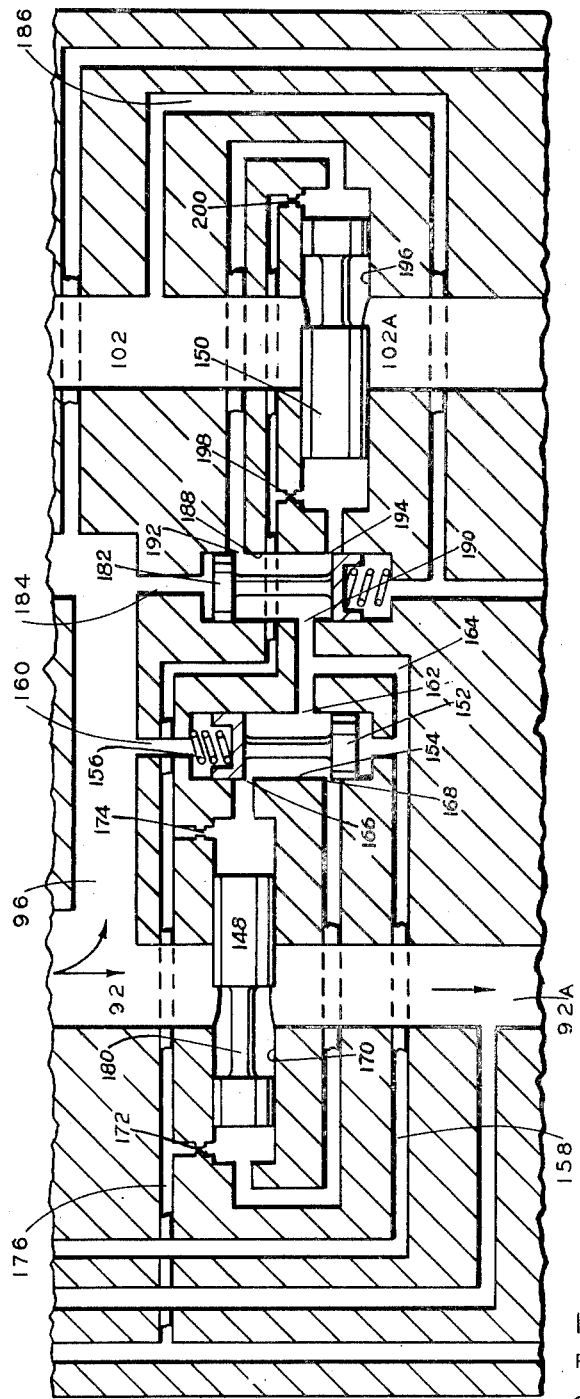
Fig. 5 is a view of a part of the fuel control of Fig. 3 showing the mechanism by which the pressure drop across the orifices may be controlled.

A constant pressure drop across the metering ports is maintained so that the fuel will be proportional to the area of the port opening. This is accomplished by plunger valves 148 and 150 controlling the flow area of passages 92 and 102 respectively. As shown in Fig. 5, the plunger valve 148 between channels 92 and 92a is controlled by a relay valve 152, slidable in a bore 154 and normally moved downward by a spring 156. The lower end of bore 154 is connected by a channel 158 to inlet passage 89. The other end of bore 154 is connected by a channel 160 to passage 96. Bore 154 has an inlet 162 connected by a channel 164 to the channel 158, and the plunger 152 alternately admits fluid from port 162 to outlet ports 166 and 168. These outlet ports are connected respectively to the right and left hand ends of the bore 170 in which the plunger valve 148 is slidable. Throttle vents 172 and 174 permit discharge of fluid from bore 170, these vents being connected by a channel 176 to an overflow or drain channel 178. By the use of this device, as the pressure in channel 92 drops with respect to the pressure in inlet channel 89, relay valve 152 moves upward causing fluid to enter the right hand end of bore 170 to move the plunger valve 148 to the left, thereby closing the passage area in channel 92. The fuel flow from channel 92 to 92a around a reduced central portion 180 of the plunger valve is thus restricted, and the pressure in channel 92 increases, until the pressure difference between channel 89 and channel 92 becomes equal to the value pre-selected by spring 156.

The control for the pressure drop across the ports 100 and 108 that control the burner fuel is operated in a similar manner. A relay valve 182 is connected at opposite ends to the channel 96 and the channel 102 respectively as by channels 184 and 186. Bore 188 for valve 182 has an inlet port 190 and spaced outlet ports 192 and 194, connected to opposite ends of the bore 196 in which plunger valve 150 is slideable. Discharge vents 198 and 200 for the opposite ends of bore 196 are connected to the channel 176.

It may be advantageous to have a pressure relief valve to prevent overloading of the fuel pumps supplying fuel to channel 89. To accomplish this, the inlet passage 89 is interconnected by a cross passage 202 to the drain passage 178. A spring loaded valve 204 normally closes passage 202. In addition to the spring 206 holding the valve 204 closed, pressure from channel 92A is applied to bellows 208 by conduit 210. If the pressure difference across the metering ports 90 and 106 plus that across the plunger valve 148 becomes excessive, that is, if the pressure difference between inlet passage 89 and outlet passage 92A becomes excessive, the valve 204 will open, reducing the pressure in passage 89 by bleeding off fluid to drain 178.

Valve 204 also maintains a calibrated sensitivity in plunger valve 148 and prevents possible vapor formation accompanying high pressure drops across valve 148.

It may be advantageous to have a pressure relief valve in the generator fuel supply channel, so that in case of failure of one or more of the generators to operate, the remaining generators are not overloaded. To accomplish this, a plunger 212 fits in a sleeve 214, which is slidable in a bore 216 and which may be adjusted axially by a gear 218. A spring 220 within an evacuated bellows 222 in a chamber 224 and acting on plunger 212 balances the pressure in channel 92A which acts on the end of the plunger. The sleeve connects channel 92A and channel 224 and has ports 225 normally closed by the plunger 212. When the pressure in channel 92A becomes excessive, under conditions of generator overload, the plunger 212 is displaced to the right and uncovers ports 225 to permit fuel to flow from channel 92A into chamber 224.

It is seen that the position of the plunger 212 is determined by the absolute pressure in channel 92A, by virtue of the evacuated bellows 222. Further, the sleeve 214 is slidable within the bore 216, and is actuated by the gear 218, so that the absolute pressure within channel 92a at which ports 225 open, can be controlled by rotation of the gear 218. Gear 218 may be linked to the main control shaft 84, as diagrammatically represented in Fig. 3, so that the degree of overload can be made a function of main control lever position.

The fuel from chamber 224 passes into a bore 228, where it is delivered by a selector valve 230 either through conduit 226 to the burner supply channel 102A, or through a conduit 232 to drain 178. Valve 230 is slidable within the bore 228. This bore is open at the bottom to the pressure of channel 96 by a conduit 235, and at the upper end to the pressure of channel 102 by way of conduits 186 and 236. The selector valve 230 is loaded at the top by spring 234.

At low generator outputs, whenever port 100 is closed, as determined by the rotation of the main control shaft 84, the fuel vented from channel 92A by valve 212, under generator overload conditions, passes from chamber 224 into drain 178. This results from the high pressure difference between channels 96 and 102, which occurs when there is no flow through port 100. This high pressure difference moves the selector valve 230 upward, against the spring, so that conduit 232 is open, and conduit 226 is closed by the valve.

If one or more of the generators should fail at high power, however, it may be advantageous to deliver the fuel not used by the generators to the oil burner circuit, essentially recovering the loss in power. At high power operation, the port 100 is open, and the pressure difference between channel 96 and channel 102 is controlled to a predetermined value by the relay valve 182. This pressure difference is not enough to overcome the force of the spring 234, and the selector valve 230 is forced to the bottom of bore 228, thus opening conduit 226 and closing conduit 232.

It is to be understood that the invention is not limited to the specific embodiment herein illustrated and described, but may be used in other ways without departure from its spirit as defined by the following claims.

I claim:

1. Fuel flow controlling means for a power plant including a number of internal combustion gas generators, and a burner through which gas from the generators passes and in which additional fuel is burned, said fuel flow controlling means including a supply conduit and branch conduits from the supply to the generators and to the burner, a metering orifice in the branch conduit to the generators for controlling the fuel flow to said generators, another metering orifice in the branch conduit to the burner for controlling the fuel supply to said burner, one of said orifices including sleeves having overlapping openings through which the fuel flows, and means separately adjusting said sleeves, and one of said sleeves having an opening forming a part of the other metering orifice whereby both orifices may be adjusted simultaneously.

2. Fuel flow controlling means for a power plant including a number of internal combustion gas generators, and a burner through which gas from the generators passes and in which additional fuel is burned, said fuel flow controlling means including a supply conduit and branch conduits from the supply to the generators and to the burner, a metering orifice in the branch conduit to the generators for controlling the fuel flow to said generators, another metering orifice in the branch conduit to the burner for controlling the fuel supply to said burner, each of said orifices including relative movable elements having overlapping openings through which the fuel flows, means for adjusting the elements for each of said orifices separately, and one element of one orifice being connected to and moving with one of the elements of the other orifice.

3. Fuel flow controlling means for a power plant including a number of internal combustion gas generators, and a burner through which gas from the generators passes and in which additional fuel is burned, said fuel flow controlling means including a conduit supplying fuel to the generators, and another conduit supplying fuel to the burner, a connection between the conduits, and a valve responsive to pressure changes in said first conduit for controlling the flow through said connection.

4. Fuel flow controlling means for a power plant including a number of internal combustion gas generators, and a burner through which gas from the generators passes and in which additional fuel is burned, said fuel flow controlling means including a conduit supplying fuel to the generators, and another conduit supplying fuel to the burner, a connection between the conduits, and a valve responsive to pressure changes in said first and second conduits for controlling the flow through said connection.

5. Fuel flow controlling means for a power plant including a number of internal combustion gas generators, and a burner through which gas from the generators passes and in which additional fuel is burned, said fuel flow controlling means including a conduit supplying fuel to the generators, and another conduit supplying fuel to the burner, a connection between the conduits, and a normally closed valve in said connection, pressure responsive means for moving said valve, and a connection from said first conduit to said pressure responsive means whereby said valve is movable in response to an increase in pressure in said first conduit resulting from non-operation of at least one of the generators for opening said valve whereby a portion of the fuel in the generator supply conduit is by-passed to the burner.

6. Fuel flow controlling means for a power plant including a number of internal combustion gas generators, and a burner through which gas from the generators passes and in which additional fuel is burned, said fuel flow controlling means including a conduit supplying fuel to the generators, and another conduit supplying fuel to the burner, and means responsive to an increase in pressure in said first conduit resulting from non-operation of at least one of the generators for delivering a part of the fuel from said first conduit to said second conduit.

RICHARD J. COAR.

REFERENCES CITED

The following references are of record in the file of this patent:

UNITED STATES PATENTS

| Number | Name | Date |
|---|---|---|
| 644,741 | Guthrie | Mar. 6, 1900 |
| 1,479,802 | Glendenning | Jan. 8, 1924 |
| 2,139,284 | Rieseler | Dec. 6, 1938 |
| 2,160,218 | Kingston et al. | May 30, 1939 |
| 2,179,628 | Heinzelmann | Nov. 14, 1939 |
| 2,238,905 | Lysholm | Apr. 22, 1941 |
| 2,266,533 | Brisbane | Dec. 16, 1941 |
| 2,292,288 | Pateras Pescara | Aug. 4, 1942 |
| 2,343,375 | Herman | Mar. 7, 1944 |
| 2,374,844 | Stokes | May 1, 1945 |
| 2,379,455 | Prince | July 3, 1945 |
| 2,419,171 | Simpson et al. | Apr. 15, 1947 |
| 2,422,808 | Stokes | June 24, 1947 |
| 2,447,124 | Kalitinzky et al. | Aug. 17, 1948 |

FOREIGN PATENTS

| Number | Country | Date |
|---|---|---|
| 523,468 | Great Britain | July 15, 1940 |